United States Patent Office.

IMPROVED BURNING FLUID.

WILLIAM B. ROGERS, OF CHICAGO, ILLINOIS.

Letters Patent No. 60,559, dated December 18, 1866.

---

The Schedule referred to in these Letters Patent and making part of the same.

---

TO ALL WHOM IT MAY CONCERN:

Be it known that I, WILLIAM B. ROGERS, of Chicago, Cook county, State of Illinois, have invented a new and improved Fluid for Illuminating and other Purposes; and I do hereby declare that the following is a full, clear, and exact description of the mode of making and using the same.

The object of my invention is to produce a new and improved burning fluid, for use in any of the well-known oil lamps, which fluid shall be entirely non-explosive, free from smoke and disagreeable odor, and which will be found useful as a carbonizer for enriching carburetted hydrogen or common illuminating gas. It consists in mixing with volatile hydro-carbon oils, certain substances which will not only deprive them of or neutralize their explosive properties, but which will improve their illuminating qualities and render them pure and inoffensive as to smell. The following is a description of the kind and proportions of ingredients used:

To forty gallons of crude petroleum, or to a similar quantity of the oils or substances known as gasoline, benzine, benzole, or naphtha, I add one pound of caustic soda or other suitable alkali, one pound of pulverized alum, one pound of fine salt which is free of lime, one ounce of manganese, and four ounces of water. These substances are simply mixed and allowed to stand until the solid atoms settle, when the oil is ready for use. If desirable, any of the aromatic oil may be introduced into the fluid for deodorizing; certain sweet-smelling gums may also be used for the same purpose. I prefer to use the above-mentioned substances in about the proportions specified, and have found the best results from such proportions; still, I do not confine my invention to the relative quantities stated, as these may be changed as circumstances require. Nor do I confine myself to the use of manganese, and of water, as these may be dispensed with. I prefer, however, to use these two last-mentioned ingredients.

This oil has not only been found superior to other oils for burning in lamps, lanterns, and torches, but it also serves a very useful and valuable purpose as a carbonizer for enriching the common illuminating gas. This is effected by enclosing a quantity of the oil in an air-tight box, of suitable capacity, and causing the gas to flow through this box as it passes from the street-mains to the service-pipes. I prefer to conduct the gas through the oil in the box; to do which several partitions may be arranged in the box so as to leave spaces alternately above and below them. The pressure on the gas will cause it to pass over and under the said partitions, and in this way it may be caused to pass beneath the surface of the oil in the box several times. Instead of conducting the gas through the oil, any of the well-known carbonizers may be employed which have large evaporating surfaces, and which will vaporize the oil and allow the vapor to mix with the gas.

Having described my invention, what I claim as new, and desire to secure by Letters Patent, is—

A burning and carbonizing fluid which is composed of the several ingredients herein mentioned, mixed together in about the proportions specified.

WM. B. ROGERS.

Witnesses:
R. T. CAMPBELL,
EDW. SCHAFER.